(12) United States Patent  (10) Patent No.: US 7,482,088 B2
Ferguson  (45) Date of Patent: Jan. 27, 2009

(54) FLOW FIELD

(75) Inventor: Dennis E. Ferguson, Mahtomedi, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1193 days.

(21) Appl. No.: 10/356,045

(22) Filed: Jan. 31, 2003

(65) Prior Publication Data

US 2004/0151970 A1  Aug. 5, 2004

(51) Int. Cl.
*H01M 2/18* (2006.01)
(52) U.S. Cl. .......................... 429/38; 429/39
(58) Field of Classification Search ............... 429/34, 429/38, 39
See application file for complete search history.

(56) References Cited

U.S. PATENT DOCUMENTS

| | | | |
|---|---|---|---|
| 4,169,917 A * | 10/1979 | Baker et al. ............... | 429/26 |
| 4,292,379 A | 9/1981 | Kothmann | |
| 4,324,844 A * | 4/1982 | Kothmann ............... | 429/26 |
| 4,631,239 A | 12/1986 | Spurrier et al. | |
| 4,686,159 A | 8/1987 | Miyoshi | |
| 4,853,301 A | 8/1989 | Granata, Jr. et al. | |
| 4,855,193 A | 8/1989 | McElroy | |
| 4,988,583 A | 1/1991 | Watkins et al. | |
| 5,108,849 A | 4/1992 | Watkins et al. | |
| 5,252,410 A | 10/1993 | Wilkinson et al. | |
| 5,338,430 A | 8/1994 | Parsonage et al. | |
| 5,641,586 A | 6/1997 | Wilson | |
| 5,683,828 A | 11/1997 | Spear et al. | |
| 5,686,199 A | 11/1997 | Cavalca et al. | |
| 5,750,281 A | 5/1998 | Washington et al. | |
| 5,773,160 A | 6/1998 | Wilkinson et al. | |
| 5,798,187 A | 8/1998 | Wilson et al. | |
| 5,804,326 A | 9/1998 | Chow et al. | |
| 5,840,438 A | 11/1998 | Johnson et al. | |

(Continued)

FOREIGN PATENT DOCUMENTS

DE  100 54 444 A1  5/2001

(Continued)

OTHER PUBLICATIONS

U.S. Appl. No. 09/430,568, filed Oct. 29, 1999, Microstructured Flow Fields.

(Continued)

*Primary Examiner*—Tracy Dove
(74) *Attorney, Agent, or Firm*—Philip Y. Dahl

(57) ABSTRACT

An article bearing a flow field such as a distribution plate for use in a fuel cell is provided. The active portion of the article, i.e., the portion of the article bearing the flow field, comprises at least two subsections; a first central subsection and a second peripheral subsection; wherein channels within the first subsection have a cross-sectional profile that differs from that of channels within the second subsection. Typically, channels of the first subsection have lesser depth, greater draft or greater ratio of draft to depth. In addition, an article bearing a flow field is provided where the flow field comprises at least two channel segments which differ in draft. In addition, an article bearing a flow field is provided where the flow field comprises at least one channel segment comprising first and second channel walls which differ in draft.

8 Claims, 3 Drawing Sheets

U.S. PATENT DOCUMENTS

| | | | |
|---|---|---|---|
| 5,846,668 A | 12/1998 | Watanabe | |
| 5,858,567 A | 1/1999 | Spear, Jr. et al. | |
| 5,858,569 A | 1/1999 | Meacher et al. | |
| 5,879,828 A | 3/1999 | Debe et al. | |
| 5,922,485 A | 7/1999 | Enami | |
| 5,945,232 A | 8/1999 | Ernst et al. | |
| 5,998,055 A | 12/1999 | Kurita et al. | |
| 6,037,072 A | 3/2000 | Wilson et al. | |
| 6,048,634 A | 4/2000 | Kaufman et al. | |
| 6,071,635 A | 6/2000 | Carlstrom, Jr. | |
| 6,080,502 A * | 6/2000 | Nolscher et al. | 429/34 |
| 6,093,502 A | 7/2000 | Carlstrom, Jr. et al. | |
| 6,099,984 A | 8/2000 | Rock | |
| 6,207,310 B1 | 3/2001 | Wilson et al. | |
| 6,207,312 B1 | 3/2001 | Wynne et al. | |
| 6,586,128 B1 * | 7/2003 | Johnson et al. | 429/34 |
| 6,783,884 B2 * | 8/2004 | Gibb et al. | 429/38 |

FOREIGN PATENT DOCUMENTS

| | | |
|---|---|---|
| EP | 1 184 923 A2 | 3/2002 |
| GB | 2 372 626 A | 8/2002 |
| WO | WO 00/41260 | 7/2000 |

OTHER PUBLICATIONS

U.S. Appl. No. 09/954,601, filed Sep. 17, 2001, Flow Field.
U.S. Appl. No. 10/295,292, filed Nov. 15, 2002, Unitized Fuel Cell Assembly.
U.S. Appl. No. 10/295,518, filed Nov. 15, 2002, Unitized Fuel Cell Assembly and Cooling Apparatus.

* cited by examiner

FLOW FIELD

FIELD OF THE INVENTION

This invention relates to articles containing flow fields for use as components of fuel cells which utilize variation in the draft and depth of the flow field channels to improve manufacturability without undue compromise of electrical contact area.

BACKGROUND OF THE INVENTION

Flow fields for distribution of fluids in electrochemical cells are described in numerous references. A number of references depict flow fields having serpentine channels, including: U.S. Pat. Nos. 4,631,239; 4,686,159; 4,853,301; 4,988,583; 5,108,849; 5,252,410; 5,683,828; 5,750,281; 5,773,160; 5,846,668; 5,858,567; 5,858,569; 5,922,485; 5,945,232; 6,071,635 and 6,099,984. A number of references depict flow fields having multiple interleaved serpentine channels, including: U.S. Pat. Nos. 5,683,828; 5,750,281; 5,773,160; 5,804,326; 5,840,438; 5,858,567; 5,998,055; 6,071,635 and 6,093,502. A number of references depict interdigitated flow fields, including: U.S. Pat. Nos. 5,252,410; 5,641,586 and 6,207,312. In an interdigitated flow field, channels having an inlet but no outlet alternate with channels having an outlet but no inlet. U.S. Pat. No. 5,686,199 depicts a flow field having a series-parallel arrangement of channels. U.S. Pat. No. 6,048,634 depicts flow field patterns wherein pairs of adjacent channels carry flow in opposite directions, including spiral patterns and serpentine patterns. In addition, the use of a metal screen as a flow field has been taught, e.g. in U.S. Pat. Nos. 4,855,193; 5,798,187; 6,037,072 and 6,207,310.

U.S. Pat. No. 6,555,261 discloses a flow field for an electrochemical cell having microflow channels of specified width, depth, and/or pitch, which may additionally comprise micro-features within the channels.

U.S. Pat. No. 6,780,536 discloses a flow field for distribution of fluids that provides uniform lateral flux of fluids across the land areas of the flow field. In one embodiment, the flow field comprises a serpentine channel that comprises non-parallel sequential major segments.

EP 1 184 923 A2 discloses a flow field comprising channels having a draft angle greater than 0 degrees, preferably at least 7 degrees, and more preferably between about 7 degrees and about 15 degrees.

U.S. Pat. No. 4,292,379 describes flow fields on either side of a bipolar plate wherein the depth and/or separation of parallel channels are varied so as to create an uneven distribution that matches the uneven distribution created by the opposing face of the plate.

SUMMARY OF THE INVENTION

Briefly, the present invention provides an article bearing a flow field which includes one or more channels, where the active portion of the article, i.e., the portion of the article bearing the flow field, comprises at least two subsections; a first subsection which includes the geometric center and excludes outer periphery of the active portion and a second subsection which excludes the geometric center and includes the outer periphery of the active portion; wherein channels within the first subsection have a cross-sectional profile that differs from that of channels within the second subsection. Typically, channels of the first subsection have lesser depth, greater draft or greater ratio of draft to depth. In addition, the present invention provides a fuel cell comprising such an article.

In another aspect, the present invention provides an article bearing a flow field which includes one or more channels, where the flow field comprises at least two channel segments which differ in draft. In addition, the present invention provides a fuel cell comprising such an article.

In another aspect, the present invention provides an article bearing a flow field which includes one or more channels, where the flow field comprises at least one channel segment comprising first and second channel walls which differ in draft. In addition, the present invention provides a fuel cell comprising such an article.

What has not been described in the art, and is provided by the present invention, is a flow field design using variation of draft and depth to improve manufacturability without undue compromise of electrical contact area.

In this application:

"form" means a mold, stamp, die or template used to impart a shape to an article in a forming process, which may include stamping, compression molding, injection molding, drop forging, embossing, and the like;

"depth" means, with regard to a channel in a plate, depth beneath the plate's top surface; and "draft" means, with regard to one or both of the walls of a differential segment of a channel in a plate, the smallest angle between a line orthogonal to the plane of the plate's top surface and a line tangent to the channel wall(s) at a point having a depth beneath the plate's top surface that is half the maximum depth of the channel. The drafts of both walls of a channel typically are essentially equal, but may also be non-equal.

It is an advantage of the present invention to provide articles comprising flow fields which are readily manufactured by forming methods and provide substantial electrical contact area.

BRIEF DESCRIPTION OF THE DRAWING

FIGS. 3A', 3B' and 3C' are details of FIGS. 3A, 3B and 3C, respectively.

DETAILED DESCRIPTION OF PREFERRED EMBODIMENTS

Figure 1:
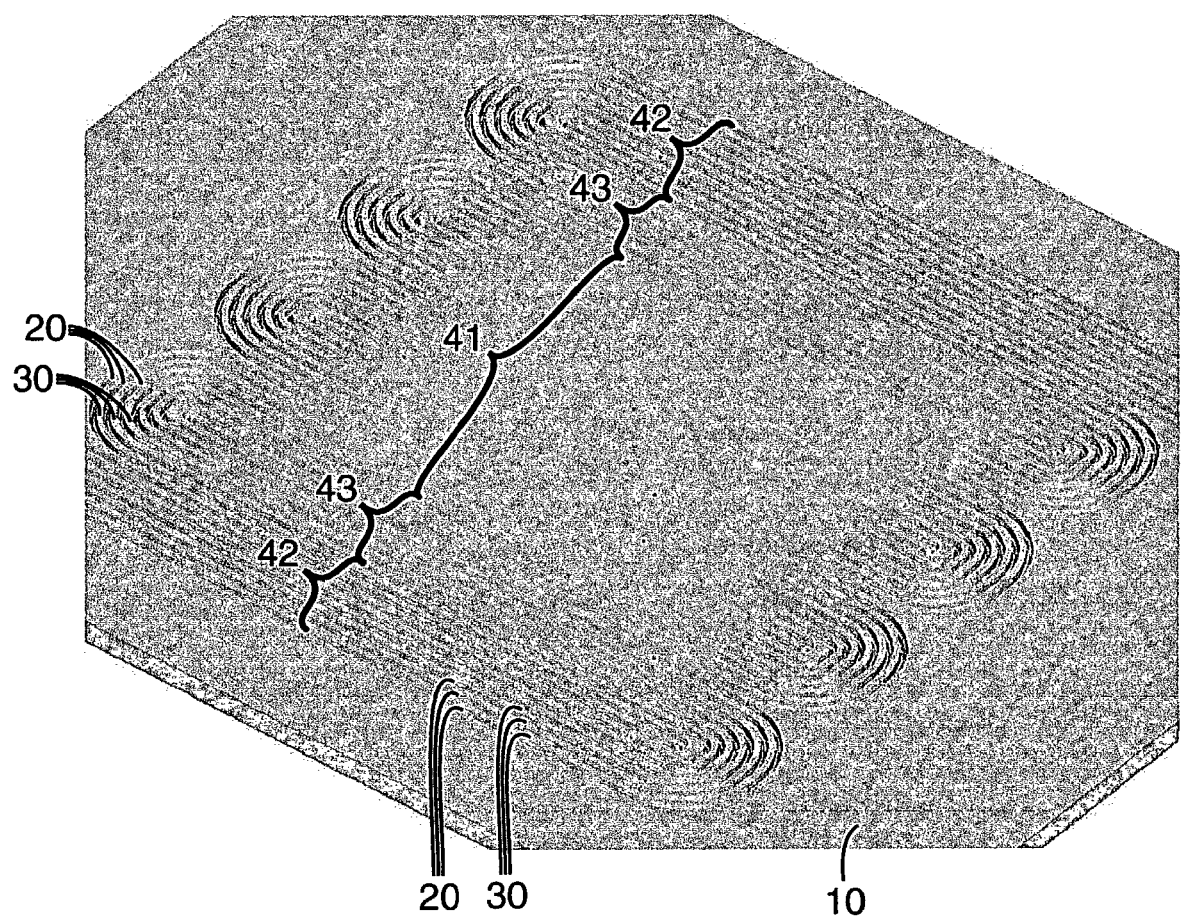
FIG. 1 is a flow field plate according to the present invention.

The present invention provides an article bearing a flow field, where the flow field is composed of one or more channels. The active portion of the article, i.e., the portion of the article bearing the flow field, comprises at least two subsections; a first subsection which includes the geometric center and excludes outer periphery of the active portion and a second subsection which excludes the geometric center and includes the outer periphery of the active portion. Channels within the first subsection have a cross-sectional profile that differs from that of channels within the second subsection, typically by lesser depth, greater draft or greater ratio of draft to depth. The article according to the present invention is typically a distribution plate of a fuel cell.

Fuel cells produce an electrical current by the reaction of a fuel such as hydrogen and an oxidizing agent such as oxygen.

Each of the two chemical reactants is brought into contact with an electrode containing a catalyst. An ion exchange element is located between the electrodes to prevent direct chemical reaction of the two reactants and to conduct ions between the electrodes. In the case of a typical hydrogen fuel cell, the ion exchange element is an "ion conducting membrane" (ICM). The ICM may also be called a "proton exchange membrane" or "polymer electrolyte membrane," both abbreviated PEM. The ICM conducts protons ($H^+$) from the hydrogen electrode (anode) to the oxygen electrode (cathode). Electrons follow a different, external electrical path, and thus an electric current is generated. At the cathode, protons ($H^+$ ions) and electrons join with oxygen to make water. The combination of an ICM and two electrodes is commonly referred to as a "membrane electrode assembly" (MEA). The catalyst electrode material may be coated directly on the ICM to form a "catalyst-coated membrane" (CCM). Typically a fluid transport layer (FTL) is applied to each side of the ICM. The FTL may also be called a "gas diffusion layer" (GDL) or a "diffuser/current collector" (DCC). The FTL is a layer of porous material which is electrically conductive yet which allows the passage of reactant and product fluids. Typical gas diffusion layers comprise carbon fibers, often in the form of a paper or a cloth. The term MEA describes a CCM with or without FTL's attached. The term 5-layer MEA specifically describes a CCM with FTL's attached. The catalyst electrode layers may be applied to the ICM or to the FTL during manufacture, so long as they are disposed between ICM and FFL so that the resulting 5-layer MEA comprises, in order: FTL, catalyst, ICM, catalyst, FTL. In the practice of the present invention, any suitable MEA's may be used.

Any suitable ICM may be used in the practice of the present invention. The ICM typically has a thickness of less than 50 µm, more typically less than 40 µm, more typically less than 30 µm, and most typically about 25 µm. The ICM is typically comprised of a polymer electrolyte that is an acid-functional fluoropolymer, such as Nafion® (DuPont Chemicals, Wilmington Del.) and Flemion™ (Asahi Glass Co. Ltd., Tokyo, Japan). The polymer electrolytes useful in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically the FTL is comprised of sheet material comprising carbon fibers. Typically the FTL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The FTL may be coated or impregnated with various materials, including carbon particle coatings, hydrophilizing treatments, and hydrophobizing treatments such as coating with polytetrafluoroethylene (PTFE).

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the ICM or to the FTL in the form of a catalyst ink. The catalyst ink typically comprises polymer electrolyte material, which may or may not be the same polymer electrolyte material which comprises the ICM. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically preferably copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an equivalent weight of 1200 or less, more typically 1100 or less, more typically 1050 or less, and most typically about 1000. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the ICM or the FTL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Alternately, a CCM may be made using a nanostructured catalyst, as disclosed in U.S. Pat. No. 5,338,430 (nanostructured electrodes embedded in solid polymer electrolyte) or U.S. Pat. No. 5,879,828 (MEA's having electrode layers comprising nanostructured elements).

The MEA is typically sandwiched between two rigid plates, known as distribution plates. The distribution plates may also be called bipolar plates (BPP's) or monopolar plates. Like the FTL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels formed in the surface(s) facing the MEA(s). These channels comprise a flow field. The areas between channels on the face of the distribution plate are called "land areas." These land areas are in electrical contact with the MEA and conduct electric current to and from the electrodes of the MEA. The distribution plate may distribute fluids to and from two consecutive MEA's in a stack, with one face directing fuel to the anode of the first MEA while the other face directs oxidant to the cathode of the next MEA (and removes product water), hence the term "bipolar plate." In this case, the anode of the first MEA is electrically connected directly to the cathode of the next and therefore the consecutive MEA's are in series. Alternately, a distribution plate may have channels on one side only, to distribute fluids to or from an MEA on only that side. This may be termed a "monopolar plate." The term bipolar plate, as used in the art, typically encompasses monopolar plates as well. A typical fuel cell stack comprises a number of MEA's stacked alternately with bipolar plates. Alternately, one-cell or multiple-cell fuel cells may be constructed using unitized fuel cell assemblies as disclosed in U.S. patent application Ser. Nos. 10/295,292 and 10/295,518, the disclosures of which are incorporated herein by reference. The article according to the present invention is typically a distribution plate of a fuel cell which may be a flow field plate as described in those references.

The distribution plate may also comprise a second set of channels for conducting cooling fluids. Cooling fluid channels may be adapted for gas (air) or liquid coolant. In use, cooling fluid channels do not open directly on the MEA.

The distribution plate provides each differential segment of the MEA with access to a channel for conduction of electrical current as well as a channel for conduction of reactant and product fluids, and therefore the design of the distribution plate must provide adequate land area as well as adequate channel volume. Furthermore, land area and channel volume must be well integrated so that both are sufficiently accessible to each differential segment of the MEA. These considerations tend to result in a convoluted design having high surface area per unit area of the face of the plate. A suitable design may take into account each of these considerations, and, in addition, may provide for ready manufacturability of the article.

The article according to the present invention may be made by any suitable process, but is typically made by a convenient forming process, such as stamping, compression molding, injection molding, drop forging, embossing, and the like. Since typical forming processes require removal of the formed article from the form without damage to the form or formed article, undercuts are avoided in the design of such articles. In addition, since surface roughness of the form is typically non-zero, vertical wall segments may also be avoided to reduce sticking during removal of the formed article from the form. Vertical wall segments can be avoided by providing some amount of draft in the walls of molded features. Deeper features may require greater draft to avoid sticking and provide a consistent manufacturing process. High surface area designs, such as the convoluted surface of a distribution plate, can be more difficult to remove from a mold and may require additional consideration.

Introducing draft to the walls of distribution plate channels may allow for greater manufacturability using convenient forming processes. Yet, while draft aids in moldability, it represents functional inefficiency in a distribution plate, since it must reduce either one of land area or channel volume without a commensurate increase in the other; i.e., if draft is added with no reduction in land area, channel volume decreases, and if draft is added with no reduction in channel volume, land area decreases. The article according to the present invention comprises a flow field in which draft is distributed so as to allow for greater manufacturability by forming processes without introducing undue functional inefficiency.

Figure 2:
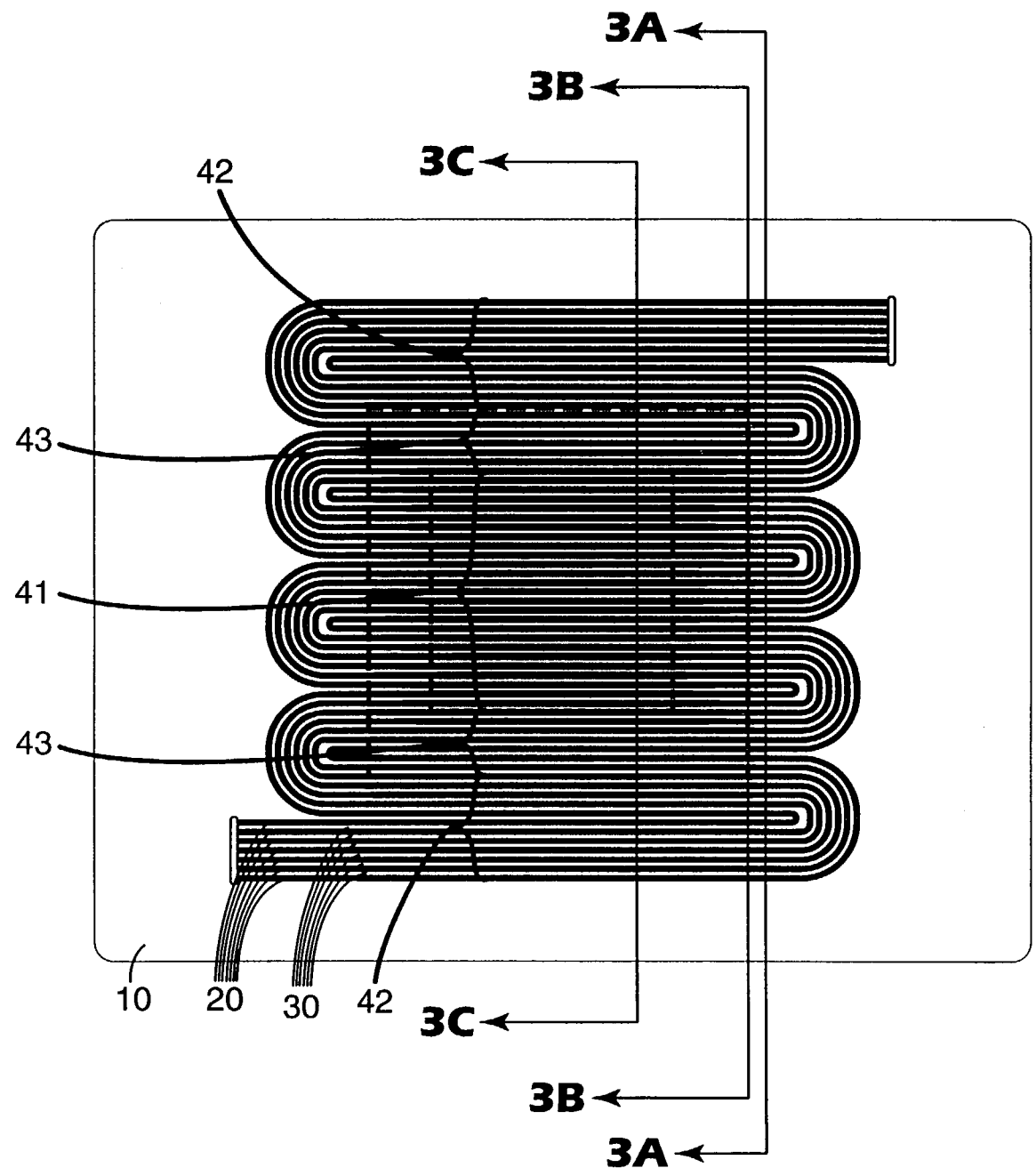
FIG. 2 is a flow field plate according to the present invention.

With reference to FIGS. 1-3, an article according to the present invention which is a fuel cell distribution plate comprises a plate (10) bearing one or more flow field channels (20) separated by land areas (30). The plate may be made of any suitable material, which may include graphite, carbon composite, metal, or plated metal materials. The plate material typically has good electrical conductivity. The plate material is typically one that can be worked in a forming process, which may include stamping, compression molding, injection molding, drop forging, embossing, and the like. The flow field may comprise a single channel or multiple channels. The channels may be in any suitable shape, including parallel patterns, serpentine patterns, zigzag patterns, interdigitated patterns, or combinations thereof. The flow field comprises a central first subsection (41) which includes the geometric center of the active portion of the plate, i.e., the portion of the plate bearing the flow field. FIG. 3C' illustrates a cross-section of a channel in the first subsection, where channel walls (21, 22) have a draft of 15 degrees. The flow field comprises a peripheral second subsection (42) which includes the outer periphery of the active portion of the plate. FIG. 3A' illustrates a cross-section of a channel in the second subsection, where channel walls (21, 22) have a draft of 5 degrees. Channels in a third subsection (43) between the first and second subsections have a draft of 10 degrees.

The flow field according to the present invention is divided into at least two zones of differing channel profile. A third intermediate zone may be added, as illustrated in the embodiment depicted in FIGS. 1-3. Additional intermediate zones may be added. In one embodiment, channel profile varies continuously from the periphery to the center of the flow field.

Typically channel profile varies by decreasing channel depth toward the center of the flow field, increasing channel draft toward the center of the flow field, or by increasing the ratio of draft to depth toward the center of the flow field. More typically, channel profile varies by increasing channel draft toward the center of the flow field or increasing the ratio of draft to depth toward the center of the flow field.

Figure 3A:
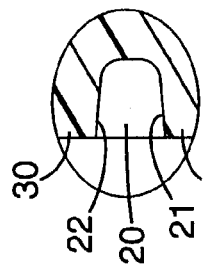
FIGS. 3A, 3B and 3C are cross-sections of a flow field plate according to the present invention.
Figure 3B:
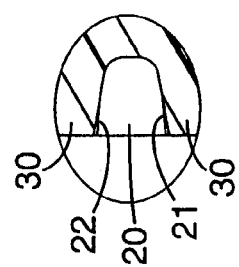
Figure 3C:
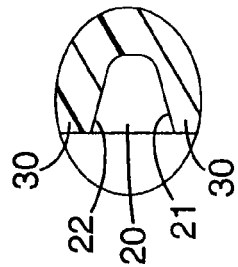
Figure 3A:
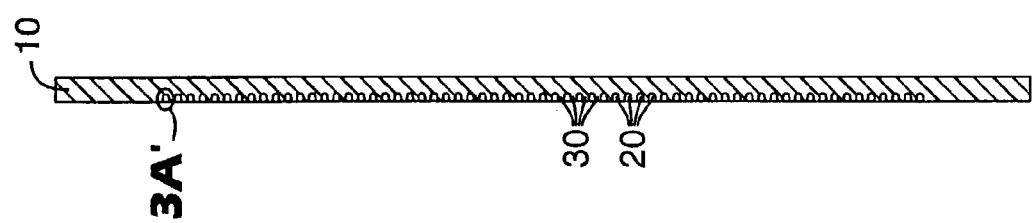
Figure 3B:
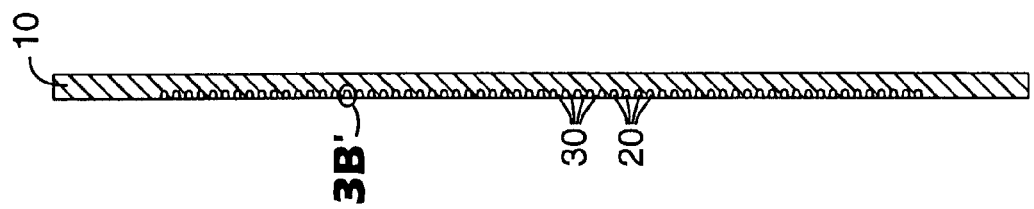
Figure 3C:
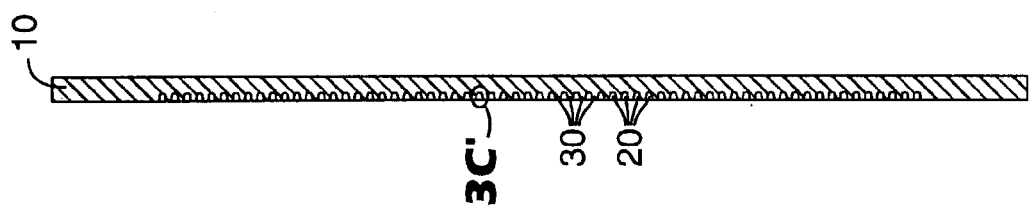

Channels comprising the flow field according to the present invention may have differing draft on opposing channel walls. With reference to FIGS. 3A', 3B' and 3C', channels have a first wall (21) and a second wall (22), the first wall being the wall closer to the geometric center of the active portion of the article and the second being closer to the periphery. In one embodiment of the present invention, the first channel wall (21) has a greater draft than the second channel wall (22). In this embodiment, the article may be formed from a material that exhibits some degree of shrinkage prior to separation from the form. In this embodiment, the draft of the second channel wall can be as low as zero.

This invention is useful in the manufacture of fuel cells which employ flow field plates or similar articles comprising flow fields.

Objects and advantages of this invention are further illustrated by the following Example, but the particular materials and amounts thereof recited in this Example, as well as other conditions and details, should not be construed to unduly limit this invention.

EXAMPLE

Three pairs of flow field plates were manufactured in order to compare the performance of each design. The plates were machined by standard methods from BMC 940 carbon composite (BMC Inc., West Chicago, Ill.). All six plates had a flow field area of 100 cm$^2$. All six plates had a channel design according to FIG. 1, differing only in draft. Draft was varied without change in channel volume. Plate set 1 (comparative) was made with zero draft. Plate set 2 was made according to the design of FIGS. 1-3C'. Plate set 3 (comparative) was made with a constant draft of 15 degrees.

Cell resistance for each set of plates was measured as follows. An MEA (3M Co., St. Paul, Minn.) was placed between each pair of plates to make a cell. One MEA was used for every run for every set of plates. The cells were placed in a hydrogen fuel cell test station manufactured by Fuel Cell Technologies (Albuquerque, N. Mex.). Hydrogen gas was supplied at ambient pressure to both sides of the MEA and cell temperature was maintained at 70° C. For each run, voltages of 10 to 100 mV were applied across the cell, electrical current was measured at several voltages, and current was plotted against voltage. A straight line was fitted to the plotted data and the slope of that line is reported as cell resistance in Table I.

TABLE I

| | Cell Resistance (mOhm) | | |
| --- | --- | --- | --- |
| | Plate 1 (comparative) No Draft | Plate 2 Variable Draft | Plate 3 (comparative) Constant Draft |
| run 1 | .614 | .612 | .674 |
| run 2 | .611 | .605 | .673 |
| run 3 | .608 | .608 | .675 |
| run 4 | | .604 | .672 |
| Average | .611 | .607 | .674 |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

I claim:

1. An article comprising a flow field which comprises one or more channels, said article comprising an active portion which is the portion of said article bearing said flow field, wherein said active portion has a geometric center and an outer periphery, wherein said active portion comprises a first subsection including said geometric center and excluding said outer periphery, wherein said active portion comprises a second subsection excluding said geometric center and including said outer periphery, wherein channels within said first subsection have a first cross-sectional profile, wherein channels within said second subsection have a second cross-sectional profile, and wherein said first cross-sectional profile differs from said second cross-sectional profile.

2. The article of claim 1 wherein said active portion additionally comprises a third subsection excluding both said geometric center and said outer periphery, wherein channels within said third subsection have a third cross-sectional profile, and wherein said third cross-sectional profile differs from both said first and said second cross-sectional profiles.

3. The article according to claim 1 wherein said first cross-sectional profile differs from said second cross-sectional profile in at least one manner selected from the group consisting of: lesser depth, greater draft and greater ratio of draft to depth.

4. The article according to claim 2 wherein said first cross-sectional profile differs from said third cross-sectional profile in at least one manner selected from the group consisting of: lesser depth, greater draft and greater ratio of draft to depth and wherein said third cross-sectional profile differs from said second cross-sectional profile in at least one manner selected from the group consisting of: lesser depth, greater draft and greater ratio of draft to depth.

5. An article comprising a flow field which comprises one or more channels, wherein said flow field comprises at least one channel segment comprising first and second channel walls wherein said first and second channel walls differ in draft, wherein said article comprises an active portion which is the portion of said article bearing said flow field, wherein said active portion has a geometric center and an outer periphery, wherein said first channel wall is closer to said geometric center than said second channel wall, and wherein said first channel wall has greater draft than said second channel wall.

6. The article according to claim 1 wherein said flow field comprises at least one channel segment comprising first and second channel walls wherein said first and second channel walls differ in draft.

7. The article according to claim 6 wherein said first channel wall is closer to said geometric center than said second channel wall, and wherein first channel wall has greater draft than said second channel wall.

8. An article comprising a flow field which comprises one or more channels, wherein said flow field comprises at least two channel segments which differ in draft, wherein said flow field comprises at least one channel segment comprising first and second channel walls wherein said first and second channel walls differ in draft, and wherein said article comprises an active portion which is the portion of said article bearing said flow field, wherein said active portion has a geometric center and an outer periphery, wherein said first channel wall is closer to said geometric center than said second channel wall, and wherein said first channel wall has greater draft than said second channel wall.

* * * * *

UNITED STATES PATENT AND TRADEMARK OFFICE
CERTIFICATE OF CORRECTION

| | |
|---|---|
| PATENT NO. | : 7,482,088 B2 |
| APPLICATION NO. | : 10/356045 |
| DATED | : January 27, 2009 |
| INVENTOR(S) | : Dennis E. Ferguson |

It is certified that error appears in the above-identified patent and that said Letters Patent is hereby corrected as shown below:

<u>Column 3</u>
Line 29; delete "FFL" and insert --FTL-- therefor.

Signed and Sealed this

Thirty-first Day of March, 2009

JOHN DOLL
*Acting Director of the United States Patent and Trademark Office*